Feb. 8, 1966 E. C. SCHROM 3,234,429
ELECTRICAL CIRCUIT FOR ELECTROHYDRAULIC SYSTEMS
Filed Nov. 13, 1963 2 Sheets-Sheet 1
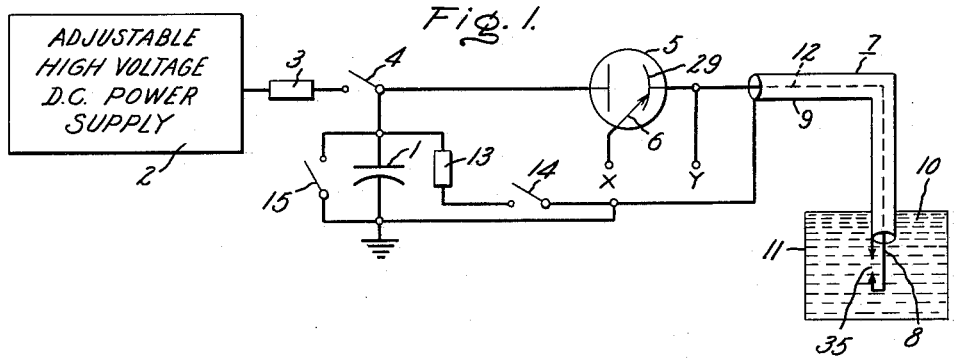
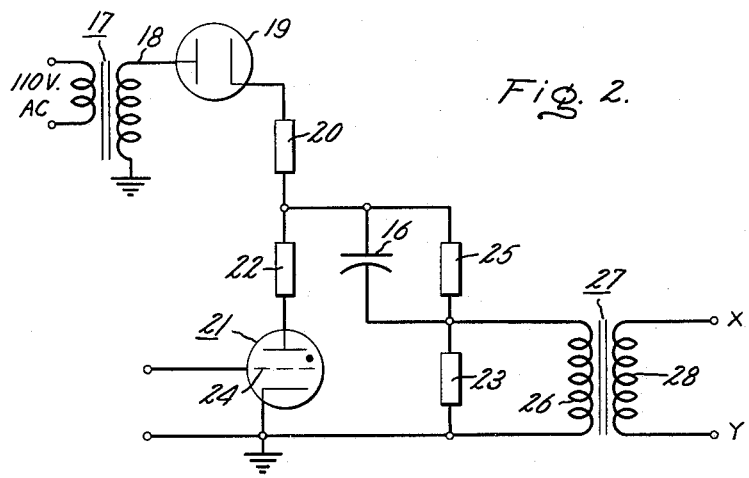
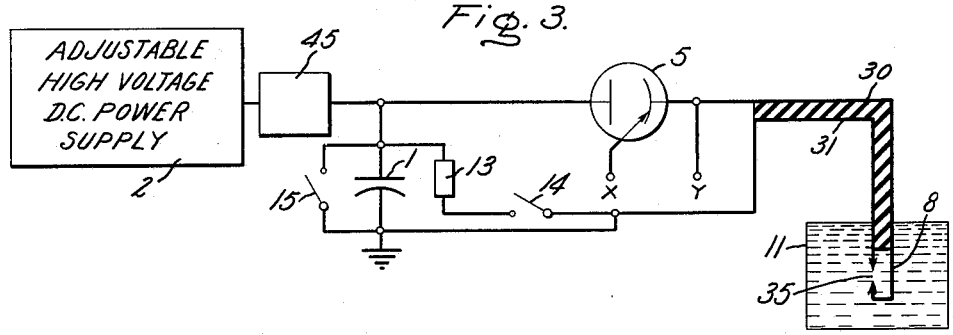
Inventor:
Edward C. Schrom,
by Paul A. Frank
His Attorney.

Feb. 8, 1966     E. C. SCHROM     3,234,429
ELECTRICAL CIRCUIT FOR ELECTROHYDRAULIC SYSTEMS
Filed Nov. 13, 1963     2 Sheets-Sheet 2
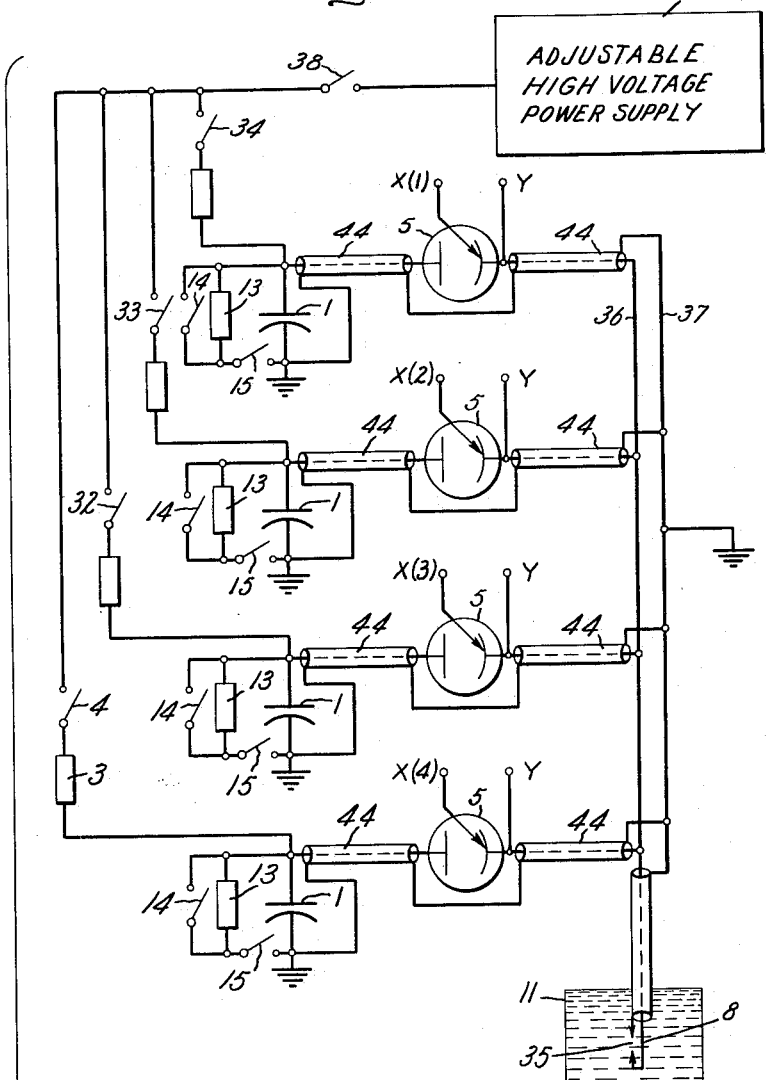
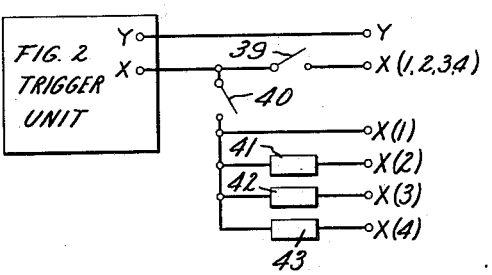
Inventor:
Edward C. Schrom,
by Paul A. Frank
His Attorney.

United States Patent Office

3,234,429
Patented Feb. 8, 1966

3,234,429
ELECTRICAL CIRCUIT FOR ELECTRO-
HYDRAULIC SYSTEMS
Edward C. Schrom, Schenectady, N.Y., assignor to General Electric Company, a corporation of New York
Filed Nov. 13, 1963, Ser. No. 323,361
10 Claims. (Cl. 315—111)

My invention relates to an improved electrical circuit for generating pulses of relatively high electric energy, and in particular, to an electrical circuit for generating such pulses and transmitting them to a spark discharge gap positioned in a liquid dielectric medium.

A recently developed apparatus, conveniently named an "electrohydraulic system," has a potential for wide application in metallurgical fields such as the forming of metals into desired shapes. The electrohydraulic technique comprises a controlled release of a relatively large magnitude of stored electric energy into a liquid dielectric medium which also contains a material to be processed. The release of the stored energy in the liquid medium generates a controlled steep pressure or shock wave therein of sufficient intensity to accomplish the particular process. The electrohydraulic method, in applications such as metal forming, has the advantage that the more exotic metals such as titanium and columbium may be readily formed into a desired shape; all of the stainless steels may be formed into a desired shape without intermediate annealing. Further, relatively close tolerances of the parts deformed is obtained by the electrohydraulic method. The intensity of the pressure or shock wave which accomplishes the useful work in the liquid medium may be controlled by controlling the magnitude of the stored electric energy or its manner of transmission into the liquid medium. Known electrohydraulic systems control the manner or rate of discharge of the stored electric energy into the liquid medium by controlling the ionization in air or gas gap switches which are contained in the discharge path. Such method of electric energy discharge control has the disadvantages of nonprecise timing since the electrodes performing the gap rapidly become eroded, resultant inconsistent and unreliable operation due to such erosion, high maintenance costs, and possible presence of contaminating materials within the enclosure containing the gap switch.

Therefore, one of the principal objects of my invention is to provide an improved electrical circuit for generating pulses of relatively high electric energy and for transmitting such energy to a liquid dielectric medium.

Another object of my invention is to provide such electrical circuit having precise timing of the pulses, consistent and reliable operation of the circuit, and lower maintenance costs.

Briefly stated and in accordance with my invention, I provide a high energy electrical circuit which comprises a first capacitor and means for charging such capacitor to a predetermined relatively high voltage and thereby storing a relatively large magnitude of electrical energy therein. A discharge circuit for the first capacitor comprises a series circuit containing a three-electrode rectifier, a shielded coaxial cable, and a spark discharge electrode. A spark gap formed by the spark discharge electrode and the shield of the cable is immersed in a liquid dielectric medium wherein a pressure or shock wave is generated upon discharge of the capacitor.

The capacitor in the high energy circuit is discharged by the initiation of conduction of the three-electrode rectifier. Conduction of the rectifier is effected by applying a triggering pulse of electric energy to a control electrode of the rectifier. The triggering pulse is generated in a low energy electrical circuit which comprises a second capacitor, a means for charging such capacitor to a voltage of intermediate magnitude, and means for discharging such capacitor to a pulse transformer at a selected time and thereby generating the triggering pulse of electric energy which is accurately controlled.

A plurality of the high energy circuits is employed to shape the shock wave within the liquid medium to a desired form.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein:

FIGURE 1 is a schematic circuit diagram of a first embodiment of a high energy electrical circuit for generating pulses of relatively high electric energy;

FIGURE 2 is a schematic circuit diagram of a low energy electrical circuit for generating the trigger pulses which initiate the generation of the high energy pulse in the circuit of FIGURE 1;

FIGURE 3 is a schematic circuit diagram of a second embodiment of a high energy electrical circuit; and FIGURE 4 is a schematic circuit diagram of a third embodiment of a high energy electrical circuit.

Referring to the schematic circuit diagram illustrated in FIGURE 1, there is shown a high energy electrical circuit comprising a charge and discharge path for capacitor 1. Capacitor 1 in general comprises a plurality of parallel connected power capacitors. Such capacitors have a high voltage and high capacitance rating. The electrical circuit which comprises the charge path for capacitor 1 includes an adjustable high voltage direct current power supply 2 which may be conventional design, a current limiting resistor 3, a switch 4, and capacitor 1 being suitably grounded. Closure of switch 4 completes the electrical circuit between high voltage power supply 2 and capacitor 1 and thereby permits the charging of the capacitor to the voltage of power supply 2 at a rate determined by the resistance-capacitance time constant of this series circuit. The average charging current is determined from the equation $$I = \frac{CV}{t}$$

where C is the capacitance, V the voltage, and $t$ the time. Since capacitor 1 has a relatively high capacitance and is charged to a relatively high voltage, it can be appreciated from the energy equation for a capacitor $$J = \tfrac{1}{2} CV^2$$

wherein J is the electric energy in joules or watt seconds, that a relatively large magnitude of electric energy can be stored within capacitor 1. The relationship $J = \tfrac{1}{2} CV^2$ is seen to provide a convenient method for controlling the energy magnitudes by varying the voltage. After capacitor 1 is charged to the desired voltage level, switch 4 is opened to disconnect the power supply from the capacitor. This step is employed as a safety precaution to prevent any of the stored energy from returning to the high voltage power supply.

After switch 4 is opened, capacitor 1 is discharged at a desired time thereafter by initiating conduction through three-electrode rectifier 5 which is connected within the discharge path of capacitor 1. Conduction of rectifier 5 is effected by applying a suitable triggering pulse of electric energy of relatively small magnitude to a control electrode 6 of rectifier 5 in manner to be described hereinafter in greater detail. The complete discharge path for capacitor 1 comprises a series circuit including capacitor 1, three-electrode rectifier 5, a low inductance electrical conductor network 12, a spark gap 35, and a return path to the ground side of capacitor 1 from a shielded portion 9 of conductor network 12. Conductor network 12 is preferably a shielded coaxial power cable 7 of a flexible type and a plurality of parallel connected sections of cable (not shown) may be conveniently employed to match the impedance of the spark gap to the impedance of the capacitor 1–rectifiers 5 portion of the discharge circuit. Cable 7 is of a construction preferably having a minimum inductance and low surge impedance.

An end portion of cable 7 is connected to a set of electrodes and is immersed in a suitable noncompressible or liquid dielectric medium 10 which is completely enclosed by container 11. Spark gap 35 is formed between the set of electrodes, a first of such being a spark discharge electrode 8 connected to an end of conductor portion 12 of cable 7 and being of any suitable configuration. The second electrode is connected to shield 9 of cable 7. A particular electrode structure especially suitable for this purpose is described in my copending and concurrently filed application, Serial No. 323,362, entitled "Electrode," and assigned to the assignee of the present invention. A liquid dielectric medium particularly suited for electrohydraulic applications is described in a second copending and concurrently filed application, Serial No. 323,363, entitled "Electrohydraulic System and Working Fluids Therefor" inventors, Edward C. Shcrom and Merton Allen, and assigned to the assignee of the present invention. The electrodes are spaced apart as widely as possible and yet obtain a discharge therebetween with minimum loss of energy. Upon discharge of capacitor 1, the stored energy passes through rectifier 5 to the spark discharge electrode 8. The electrical conductors which interconnect the paralleled capacitors and the electrical conductors which connect the capacitor bank 1 to three-electrode rectifier 5 and the shielded portion 9 of cable 7 comprise electrical bus work. The use of such bus work and the characteristics of cable 7 hereinabove described provide an electric circuit having minimum inductance commensurate with the maximum voltage employed. This minimum inductance and a maximum electrode spacing develop an electric energy discharge approaching a critically damped condition and thus provides a pulse of such energy having a relatively steep wave front. The discharge of the stored electric energy within dielectric medium 10 at the spark gap generates a steep pressure or shock wave within such medium. This pressure or shock wave can be directed to a workpiece (not shown) immersed within the liquid. The workpiece may consist of a die cavity, for example, against which a metal blank is sealed whereby the space behind it and the die cavity can be evacuated. Such arrangement provides a minimum impedance to the metal flowing into the cavity when the pressure wave hits the external surface of the metal blank. Extremely high rates of electrical discharge are obtained with my circuit since the capacitor discharges within microseconds. The mechanical energy produced by the high electric energy rates is therefore also extremely high and suitable to form the metal blank into a desired shape. The apparatus herein described which converts controllable electric energy into mechanical energy may be referred to as an electrohydraulic metal-forming system.

In FIGURE 1 a discharge resistor 13 is connected in series with a switch 14 across capacitor 1. After discharge of capacitor 1 through rectifier 5, a slight residual charge remains on capacitor 1. Closure of switch 14 after the high energy pulse has been dissipated in dielectric medium 10 obtains a complete discharge of capacitor 1 in a time interval determined by the time constant of capacitor 1 and resistor 13. This discharge time may be made shorter by closing a second switch 15 in a particular time sequence after closure of switch 14. Switch 15 is connected directly across capacitor 1. For single-pulse operation of the electrohydraulic system, switches 14 and 15 are operated at the conclusion of each pulse. For multipulse operation, such switches are operated only at the conclusion of the particular process.

A low energy electrical circuit for initiating conduction through the three-electrode rectifier 5 in FIGURE 1 is illustrated in FIGURE 2. The low energy circuit comprises a series circuit for charging a capacitor 16 to a voltage of intermediate magnitude and a circuit connected across such capacitor for discharging the same. The charge circuit for capacitor 16 comprises a voltage step-up transformer 17 having a primary side thereof connected to a conventional alternating current power source whereby the secondary side 18 supplies a voltage of intermediate magnitude, that is, a voltage which is greater than 110 volts but less than the voltage to which capacitor 1 is generally charged. A high voltage half-wave rectifier 19 is connected to the transformer secondary 18 and supplies a positive direct current voltage for charging capacitor 16. The charging path for capacitor 16 includes resistor 20 connected between rectifier 19 and capacitor 16.

The discharge circuit for capacitor 16 comprises an electronic device 21 which may be an electronic tube or semiconducting device, a load resistor 22 for such device, and resistor 23. Capacitor 16 is charged to a voltage of intermediate magnitude upon connection of the primary of transformer 17 to the alternating current power source. Capacitor 16 is discharged upon application of a triggering pulse of relatively low voltage to a control electrode 24 of electronic device 21. Application of such pulse of voltage to device 21 initiates conduction of such device and thereby completes an electrical circuit in parallel with capacitor 16. Resistor 25 is connected in parallel with capacitor 16 to provide the conventional function of a bleeder resistor. The primary side 26 of a pulse-type transformer 27 is connected directly across resistor 23. The secondary side 28 of the pulse transformer is connected across the control electrode 6–cathode 29 circuit of rectifier 5. Thus, upon the application of a pulse of relatively low voltage to control electrode 24 of electronic device 21, capacitor 16 is discharged and the discharge voltage impressed across resistor 23 also appears across the primary side 26 of the pulse transformer. A pulse of voltage having an intermediate magnitude thus appears across the secondary 28 of the pulse transformer and is supplied to the three-electrode rectifier 5 in the high energy electrical circuit, thereby initiating the conduction of such rectifier and transmitting the stored electric energy in pulse form from capacitor 1 to spark discharge electrode 8.

An example of a specific embodiment of the high energy and low energy electrical circuits illustrated respectively in FIGURES 1 and 2 comprises the following elements. Capacitor 1 is a bank of 18 parallel connected capacitors having a total capacitance of 135 microfarads. A 20 kilovolt power supply 2 provides the capacitor bank with an energy storage capability of 27,000 joules of electric energy. The discharge circuit for capacitor 1 has a ringing frequency of 12.5 kilocycles per second and a total circuit inductance of 1.6 microhenries. Such low circuit inductance is provided by constructing coaxial power cable 7 of a parallel connection of ten lengths of RG8U coaxial cable, each length being approximately twenty feet. The ten cables in parallel also match the circuit impedances and are sufficiently flexible to permit ease of handling in an open tank (container 11 having its top member removed). Three-electrode rectifier 5 is an ignitron, type GL7703, manufactured by the General Electric Company, wherein the cathode 29 is a pool of mercury. Resistors 3 and 13 have values of 8000 ohms and 12 ohms, respectively. The low energy electrical or ignitor trigger circuit comprises the following elements. Transformer 17 supplies 2500 volts from a conventional 110 volt source to high voltage halfwave rectifier 19, type 8020. Capacitor 16 is rated at 2.0 microfarads, 4000 volts D.C. Electronic device 21 is a hydrogen filled thyratron, type 5C22. The control electrode of thyratron 21 is pulsed with 150 volts and subsequent discharge of capacitor 16 applies approximately 3000 volts across resistor 23 and the primary 26 of pulse transformer 27. Resistors 20, 22, 23, and 25 have values of 20,000 ohms, 20 ohms, 20,000 ohms, and 5 megohms, respectively. The pulse transformer is a 1-1 transformer whereby the pulse applied to the control electrode (ignitor 6) of ignitron 5 is also 3000 volts. Pulse transformer 27 may be of conventional design, however, a conventional pulse transformer subjected to 3000 volts is normally encased in oil and is relatively expensive. A low cost pulse transformer especially adapted for the subject application is constructed of 75 turns of RG58U cable wound on a thinly laminated toroidal core structure having a high saturation flux density and constructed of highly grain oriented silicon steel. The shield of the RG58U cable is grounded and employed as the primary 26 and the insulated conductor is used as the secondary 28. The particular pressure or shock wave generated within liquid dielectric medium 10 is dependent upon the spark gap, electrode 8, and the medium 10 employed, as described in more detail in the copending patent applications referred to hereinabove.

A second embodiment of a high energy electrical circuit that may be employed in an electrohydraulic system is illustrated in FIGURE 3. The primary distinction between the circuits of FIGURES 1 and 3 is the charge circuit for capacitor 1. In particular, charge rate resistor 3 and switch 4 are replaced by an electrical circuit designated as a whole by numeral 45. The circuit illustrated in FIGURE 1 is conveniently employed in single pulse operation of the electrohydraulic system since switch 4 must be reclosed after each discharge of capacitor 1 to recharge such capacitor for the next pulse. Although a simplified schematic representation of the electrical circuits is employed, it is to be understood that the opening and closing of switches 4, 14, and 15 are, in general, automatically controlled by the timing of the triggering pulse applied to control electrode 24. The circuit of FIGURE 3 is conveniently employed in multipulse operation of the electrohydraulic system. Circuit 45 may comprise a suitable switching circuit such as a conventional silicon controlled rectifier circuit which operatively couples the high voltage power supply to capacitor 1 in a predetermined periodic manner. Circuit 45 is also, in general, combined in a control circuit including switches 14, 15, and the input circuit to control electrode 24. A second distinguishing feature of the high energy circuit of FIGURE 3 is the use of flat bus work for coaxial power cable 7. Two electrically conductive bus bars 30, 31 are suitably electrically insulated from each other to thereby provide a low inductance circuit. The bus work and coaxial power cable are interchangeable in FIGURES 1 and 3.

FIGURE 4 illustrates a third embodiment of the high energy electrical circuit. FIGURE 4 comprises a plurality (four being shown by way of example) of circuits or units similar to FIGURE 1 which are employed to produce any of a number of modes of operation. All four units may be connected to a common collector bus (wide, flat bus bars 36, 37, insulated to provide minimum inductance) and discharged simultaneously into one electrode configuration. This first mode of operation is accomplished by operating switches 38 and 39 with switches 4, 32, 33, 34 maintained in a closed position. A second mode of operation discharges only one, or less than four of the units, into one electrode configuration. This second mode of operation is provided by operating switch 39 and selected ones of switches 4, 32, 33, 34 with switch 38 maintained in a closed position. A third mode of operation discharges the four units into four separate electrodes (not shown) positioned above the same workpiece to thereby shape the pressure or shock pulse to a desired form. A fourth mode of operation discharges the four units in a predetermined sequence to thereby lengthen the pressure pulse. The sequential discharge is obtained by providing time delays from one microsecond to several seconds between the discharge of each unit. This fourth mode of operation is obtained by operating switches 4, 32, 33, 34, and 40 with switch 38 maintained in a closed position. Closure of switch 40 connects the control electrodes of the three-electrode rectifiers to a common source of triggering pulses (trigger unit) such as illustrated in FIGURE 2. The output of the trigger unit is connected to three variable time delay circuits 41, 42, 43, whereby the four triggering pulse outputs, designated as $X(1)$, $X(2)$, $X(3)$, and $X(4)$, respectively, provide a desired sequential initiation of conduction of the three-electrode rectifiers.

In all four modes of operation described hereinabove, the capacitors in the four units may be of equal or unequal size. Thus, the units may be charged to equal or unequal energy levels. The shielded coaxial cables 44 in the four units are of equal length to prevent undesired unequal time delays in the transmission of the discharged electric energy to the spark discharge electrode 8.

From the foregoing description, it can be appreciated that my invention makes available an improved electrical circuit for generating controlled pulses of relatively high electric energy and for releasing such energy in a liquid dielectric medium whereby a predetermined pressure or shock wave may be generated therein. The liquid, acting as a transducer, converts the convenient and controllable electric energy into mechanical energy and the high electric energy rates obtained by capacitor discharge generate high pressures within the liquid. Capacitor discharge provides a more safe and convenient process for metal forming than known explosion forming whereby chemical explosives are employed within a liquid medium to generate the pressure or shock wave therein. Further, the electrical form of energy storage is more controllable and free of explosive hazards. Thus, adjustment of the electric circuit parameters permits the rate of energy transfer to be accurately controlled to conform to the needs of the particular workpiece being processed.

Having described a single and multipulse embodiment of an electrical circuit employed in an electrohyraulic system, it is believed obvious that modification and variation of my invention are possible in the light of the above teachings. Thus, the pulse of high electric energy generated by the discharge of capacitor 1 may have a complex form as distinguished from the form obtained from a critically damped electrical discharge circuit. The complex wave form is obtained by operating a suitable switching circuit which prevents a reversal of the current and voltage from occurring and is commonly known as a crowbar circuit. It is, therefore, to be understood that changes may be made in the particular embodiments as described which are within the full intended scope of the invention as defined by the following claims.

What I claim as new and desire to secure by Letters Patent of the United States is:

1. An electrical circuit for releasing pulses of relatively high electric energy in a relatively noncompressible dielectric medium comprising
   a high energy electric circuit comprising
      a first capacitor,
      means for charging said first capacitor to a relatively high voltage and thereby storing a relatively large magnitude of electric energy therein,
      means for discharging said first capacitor, and
      means for transmitting the stored electric energy in pulse form to a spark gap positioned in a relatively noncompressible dielectric medium, and a low energy electrical circuit comprising
- a second capacitor,
- means for charging said second capacitor to a voltage of intermediate magnitude,
- means for discharging said second capacitor and thereby producing a triggering pulse of electric energy of relatively small magnitude, and
- means for transmitting the triggering pulse to said first capacitor discharge means and thereby initiating the discharge of said first capacitor.

2. An electrical circuit for releasing pulses of relatively high electric energy in a relatively noncompressible dielectric medium comprising
- a high energy electrical circuit comprising
  - a first capacitor,
  - means for charging said first capacitor to a relatively high voltage and thereby storing a relatively large magnitude of electric energy therein, and
  - means for discharging said first capacitor and transmitting the stored electric energy in pulse form to a spark gap positioned in a relatively noncompressible dielectric medium, and
- a low energy electrical circuit comprising
  - a second capacitor,
  - means for charging said second capacitor to a voltage of intermediate magnitude,
  - a pulse transformer having a primary side in series circuit relationship with said second capacitor and a secondary side operatively coupled to said means for discharging said first capacitor, and
  - means for discharging said second capacitor across the primary side of said pulse transformer and thereby producing a triggering pulse of electric energy of relatively small magnitude which initiates the discharge of said first capacitor.

3. The electrical circuit set forth in claim 2 wherein said pulse transformer comprises a toroidal core and a cable wound thereon, said cable comprising a shielded conductor wherein the shield is the primary and the conductor is the secondary of said transformer.

4. The electrical circuit set forth in claim 1 wherein said means for discharging said first capacitor comprises a three-electrode rectifier, and
said means for transmitting the stored electric energy comprises a plurality of parallel connected cables having a low surge impedance, each said cable comprising a shielded conductor wherein the conductor interconnects said means for discharging said first capacitor and a spark discharge electrode at said spark gap, and the shield comprises a ground return to a first side of said first capacitor.

5. An electrical circuit for releasing pulses of relatively high electric energy in a liquid dielectric medium comprising
- a high energy electrical circuit comprising
  - a first capacitor,
  - means for charging said first capacitor to a relatively high voltage and thereby storing a relatively large magnitude of electric energy therein, and
  - means for discharging said first capacitor and transmitting the stored electric energy to a liquid dielectric medium, said discharging and transmitting means comprising a first series circuit including a three-electrode rectifier, a spark gap positioned in the liquid medium, and a low inductance electrical conductor network, and
- a low energy electrical circuit comprising
  - a second series circuit comprising means for supplying a direct current voltage of intermediate magnitude, a second capacitor, and a resistor, said second capacitor being intermittently charged to the voltage of intermediate magnitude,
  - an electronic device having a control electrode, said electronic device connected in parallel circuit relationship with said second capacitor and said resistor whereby conduction of said electronic device effects discharge of said second capacitor through said resistor, conduction of said electronic device rendered conductive by application of a relatively low voltage to the control electrode thereof, and
  - a pulse transformer having a primary side connected in parallel circuit relationship with said resistor and a secondary side electrically coupled to said three-electrode rectifier whereby discharge of said second capacitor renders said three-electrode rectifier conductive and thereby discharges said first capacitor and supplies the stored electric energy to said spark gap.

6. An electrical circuit for releasing pulses of electric energy in a liquid dielectric medium comprising
- a high energy electric circuit comprising
  - a first capacitor,
  - means for charging said first capacitor to a relatively high voltage and thereby storing a relatively large magnitude of electric energy therein, and
  - a first series circuit comprising a three-electrode rectifier, a spark gap positioned in a liquid dielectric medium, and means for transmitting the stored electric energy to said spark gap, said first series circuit connected in parallel circuit relationship with said first capacitor whereby said first capacitor is discharged upon conduction of said rectifier and thereby supplies the stored electric energy in pulse form to said spark gap, and
- a low energy electric circuit for initiating the conduction of said rectifier comprising
  - a second series circuit comprising a first transformer having a primary side adapted to be connected to a source of alternating current electric power and a secondary side supplying a voltage of intermediate magnitude, a rectifier, a second capacitor, and a resistor, said second capacitor being intermittently charged to the voltage of intermediate magnitude,
  - an electronic device having a control electrode, said electronic device connected in parallel circuit relationship with said second capacitor and said resistor, said second capacitor being discharged by said electronic device upon application of a pulse of relatively low voltage to said control electrode, and
  - a pulse transformer having a primary side connected in parallel circuit relationship with said resistor and a secondary side connected in parallel circuit relationship across two of the electrodes of said three-electrode rectifier whereby discharge of said second capacitor renders said three-electrode rectifier conductive and thereby discharges said first capacitor.

7. A high energy electrical circuit comprising
- a capacitor,
- means for charging said capacitor to a desired high voltage and thereby storing a relatively large magnitude of electric energy therein,
- a series circuit comprising a three-electrode rectifier, a shielded coaxial cable, and a spark discharge electrode, a first end of the conductor portion of said cable connected to a first electrode of said rectifier, a second end of said conductor portion connected to said spark discharge electrode, said spark discharge electrode immersed in a liquid dielectric medium, the shield portion of said cable connected to a first side of said capacitor, and
- a second electrode of said rectifier connected to a second side of said capacitor whereby initiation of conduction of said rectifier discharges the capacitor and thereby transmits the stored electric energy in pulse form to the liquid medium.

8. A low energy electrical circuit comprising
a series circuit comprising a first transformer having a primary side adapted to be connected to a source of alternating current electric power and a secondary side supplying a voltage of intermediate magnitude, a rectifier, a capacitor, and a resistor,
an electronic device having a control electrode, said electronic device connected in parallel circuit relationship across the series connection of said capacitor and said resistor, said capacitor being discharged by said electronic device upon application of a pulse of relatively low voltage to said control electrode, and
a pulse transformer comprising a toroidal core and a shielded coaxial cable wound thereon, the shield portion of said cable comprising the primary side of said pulse transformer and the conductor portion of said cable comprising the secondary side of said pulse transformer, said primary side connected in parallel circuit relationship across said resistor, said secondary side connected to a load for utilizing the pulse of electric power produced by the pulse transformer upon discharge of the capacitor across said resistor.

9. An electrical circuit for releasing pulses of relatively high electric energy in a relatively noncompressible dielectric medium, said circuit comprising
a plurality of high energy storage and discharge units, each said unit comprising
a capacitor,
switching means for individually connecting each said capacitor to a common high voltage power supply and thereby storing a relatively large magnitude of electric energy therein,
means for individually discharging each said capacitor, and
means for transmitting the stored electric energy in pulse form to a spark gap positioned in a relatively noncompressible dielectric medium,
said discharging means of each unit operable at predetermined times whereby the pulse of electric energy released in said medium may be controlled.

10. The electrical circuit set forth in claim 9 wherein said discharging means in each unit comprises a three-electrode rectifier having a control electrode,
said control electrodes connected to a common source of pulsed electric energy for initiating the conduction through said rectifiers whereby said capacitors become discharged, the connection between said control electrodes and said common source of pulsed energy comprising variable time delay circuits whereby said rectifiers may be rendered conductive at different times.

References Cited by the Examiner

UNITED STATES PATENTS

| | | | |
|---|---|---|---|
| 2,686,263 | 10/1954 | Konack | 328—32 |
| 2,693,532 | 11/1954 | Krienen | 328—67 |
| 2,931,948 | 4/1960 | Forgacs | 315—241 |
| 3,093,770 | 5/1963 | Wesley | 315—241 |

References Cited by the Applicant

"Capacitor Discharge Metal Forming," USAF ASD Interim Report 7-844(IV) January 1962.

GEORGE N. WESTBY, *Primary Examiner.*

S. D. SCHLOSSER, *Assistant Examiner.*